Patented Mar. 20, 1923.

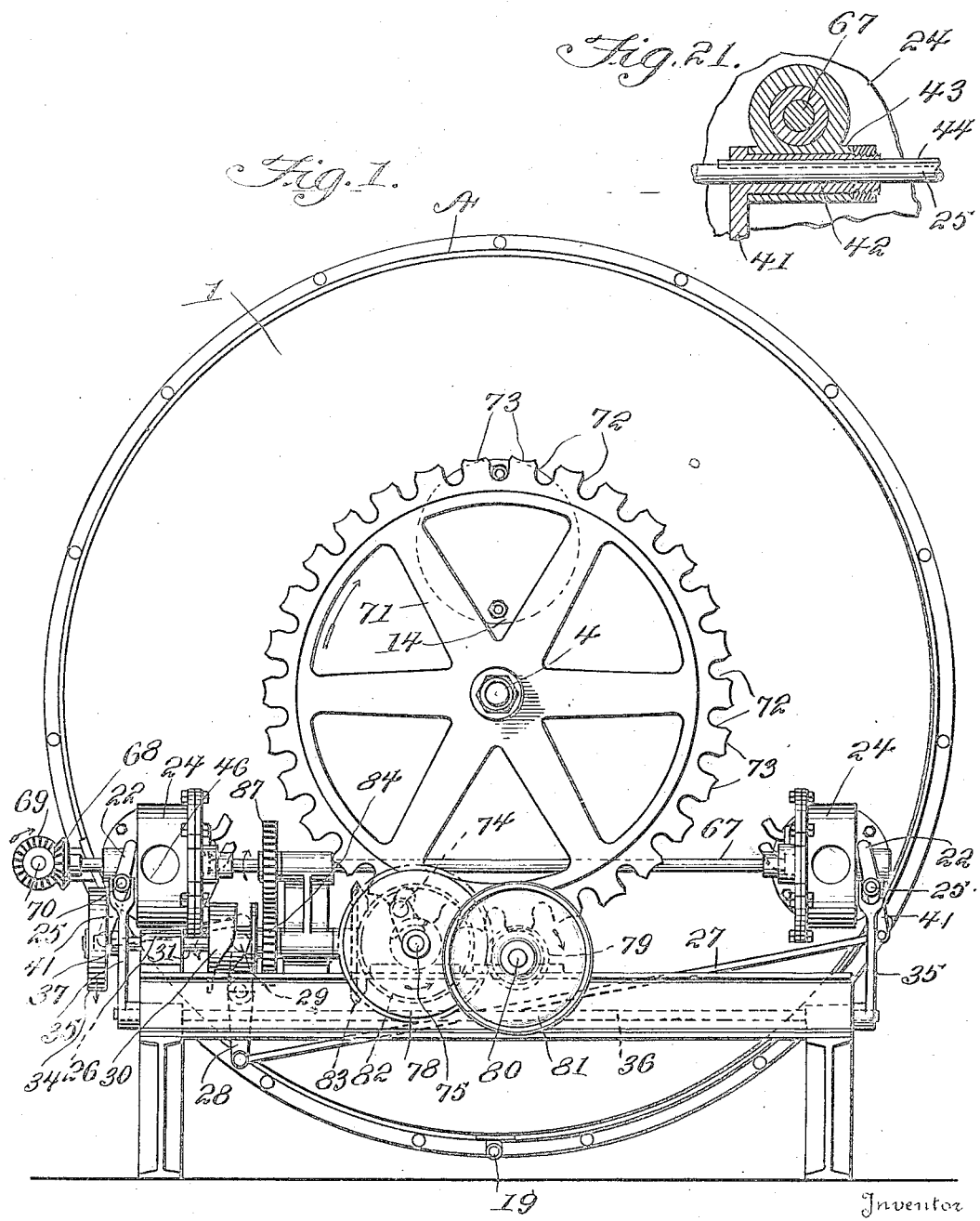

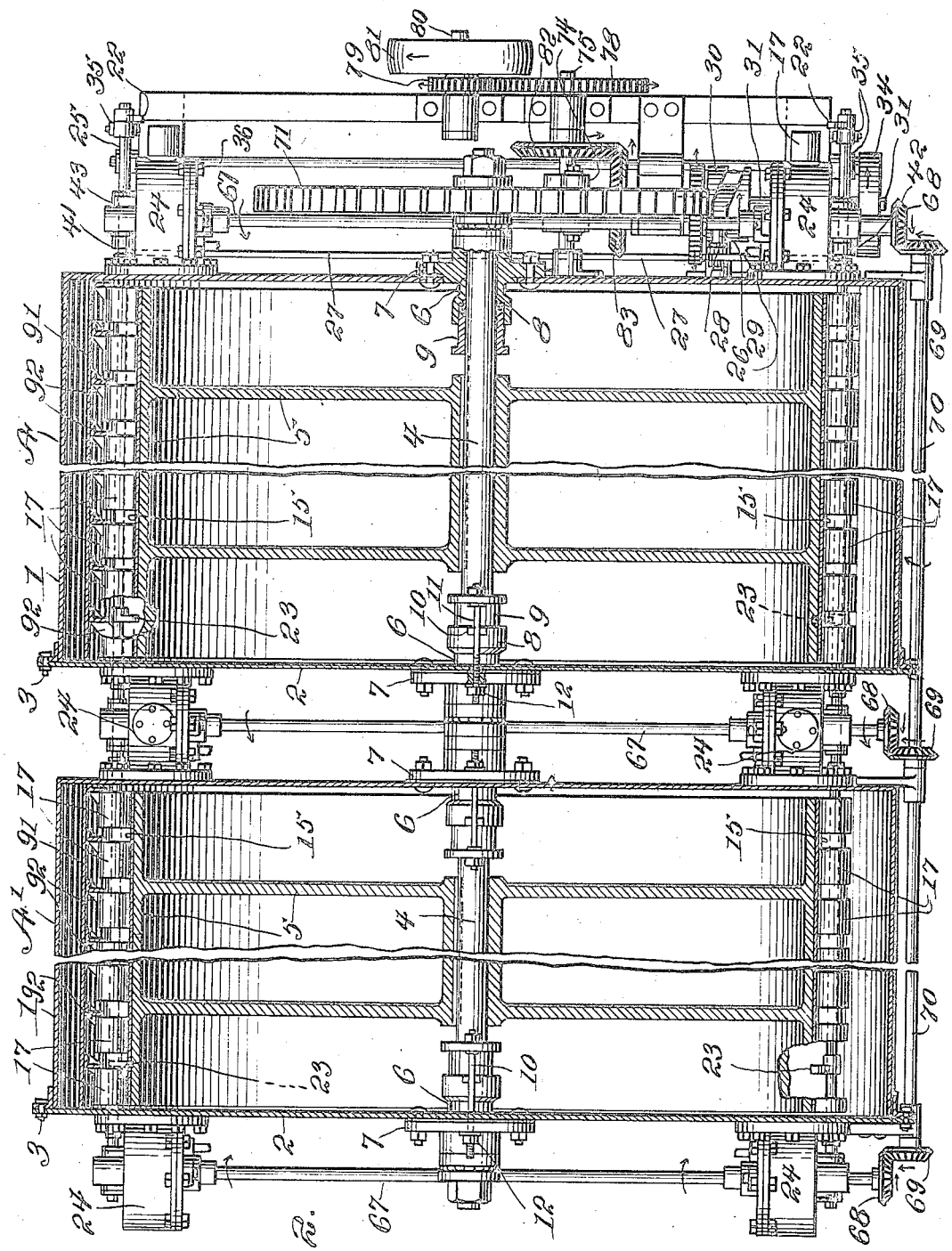

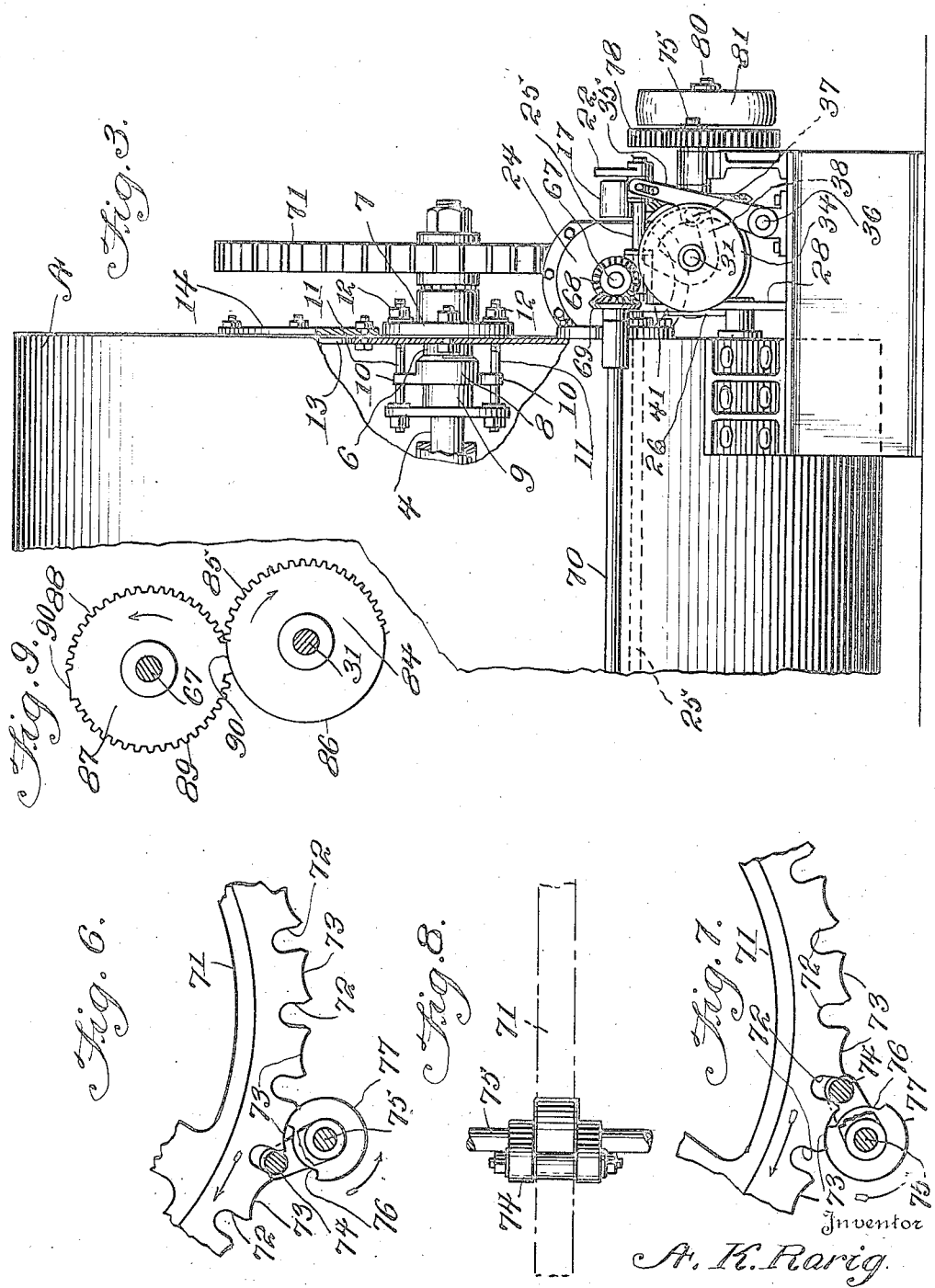

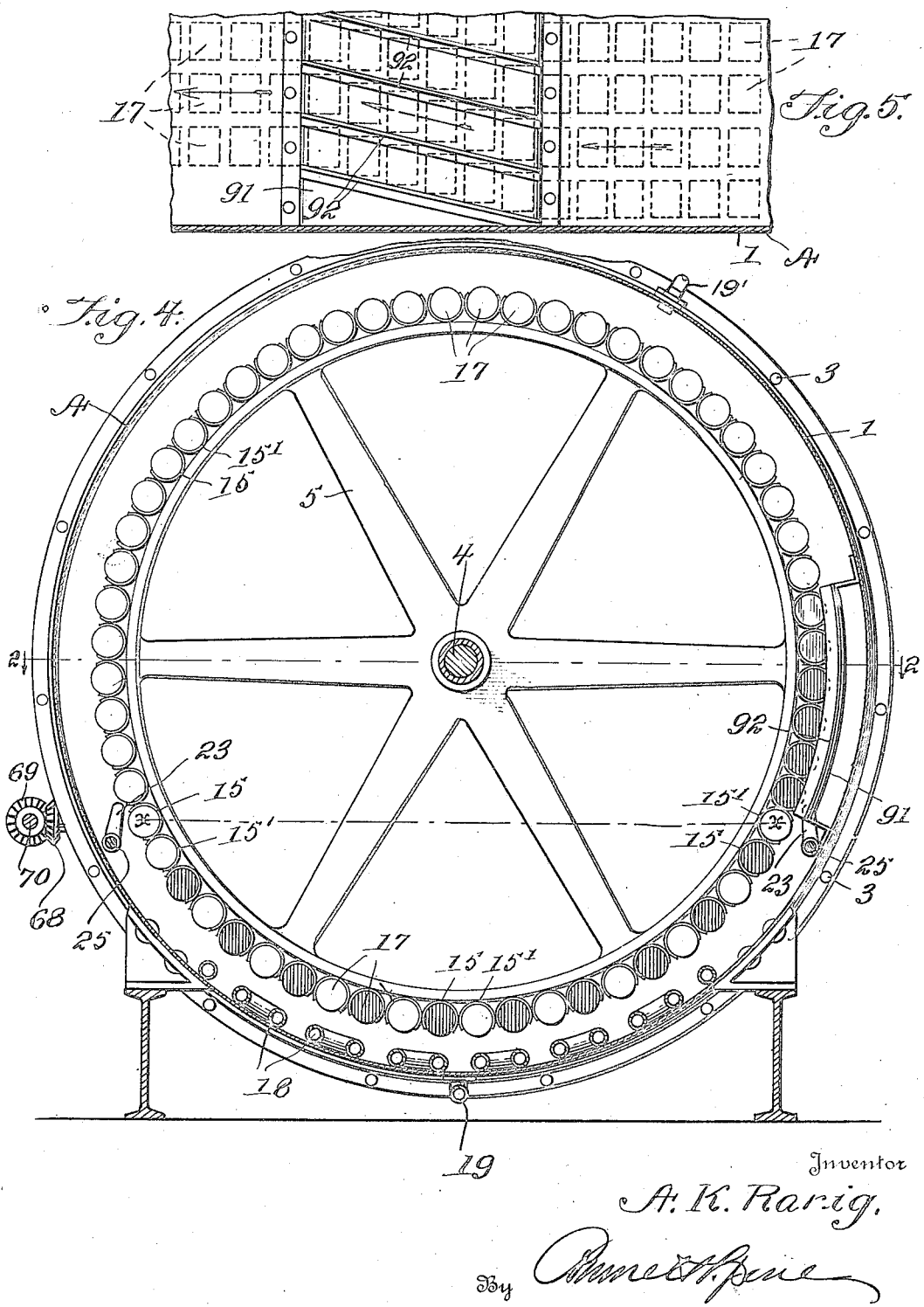

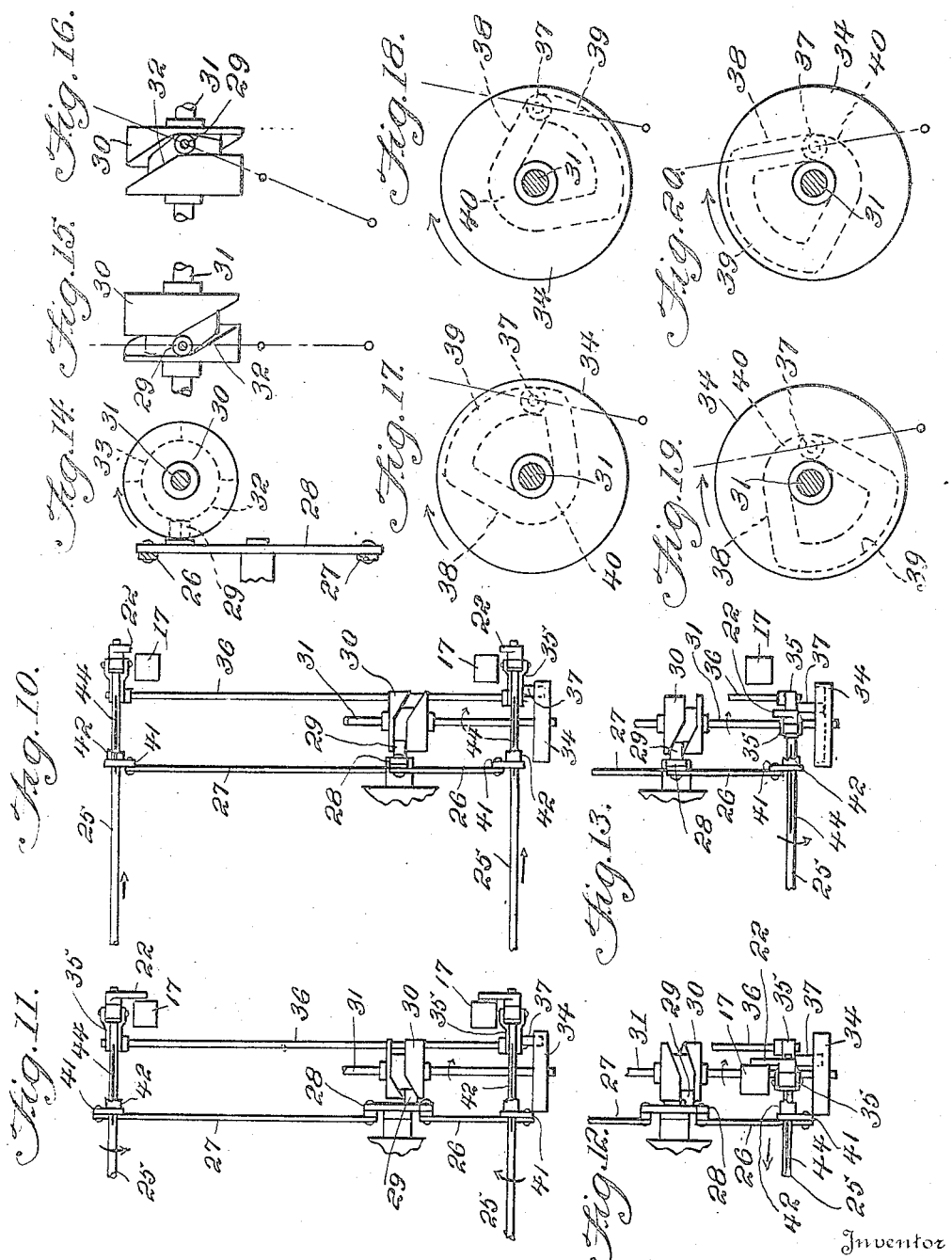

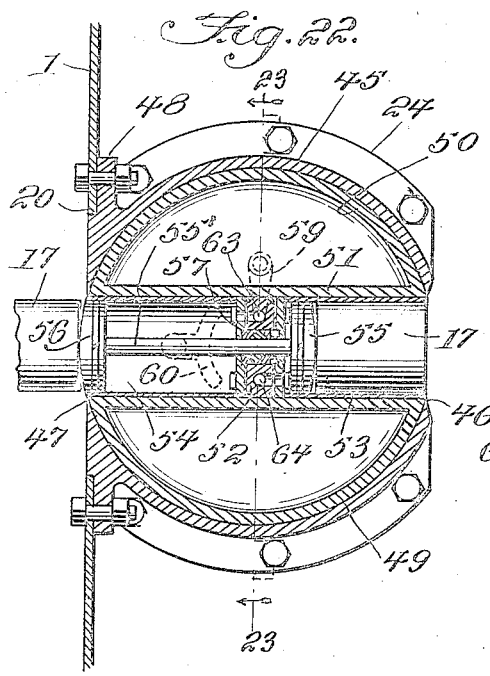
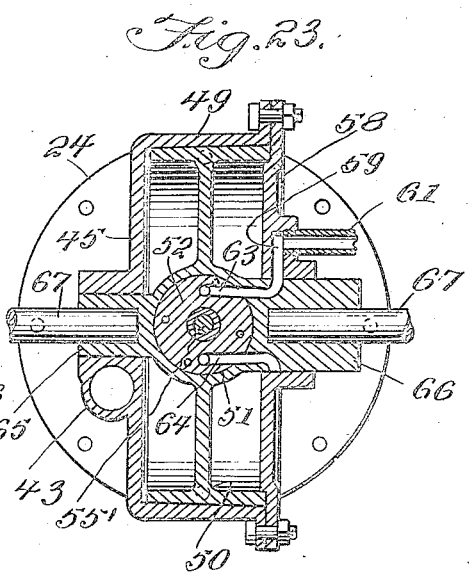
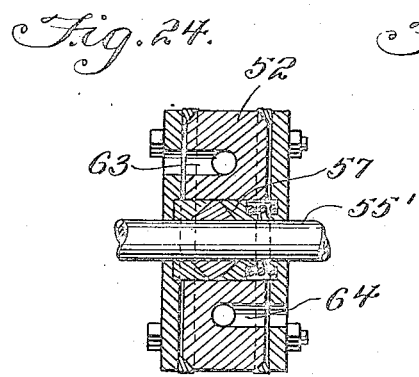
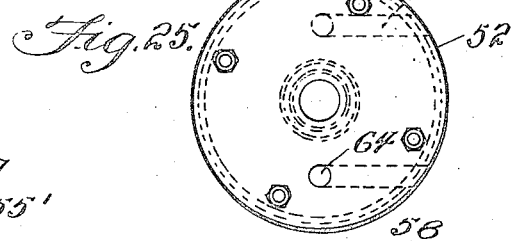
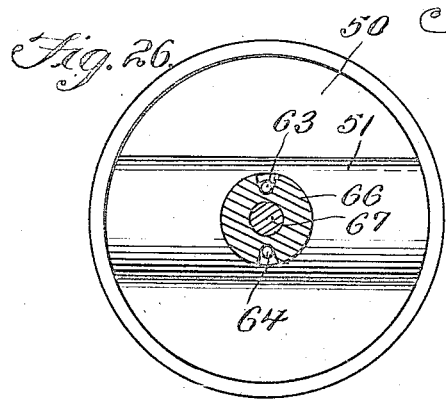
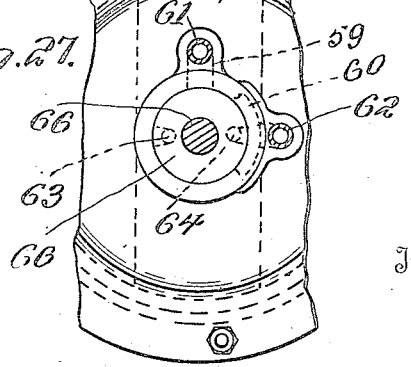

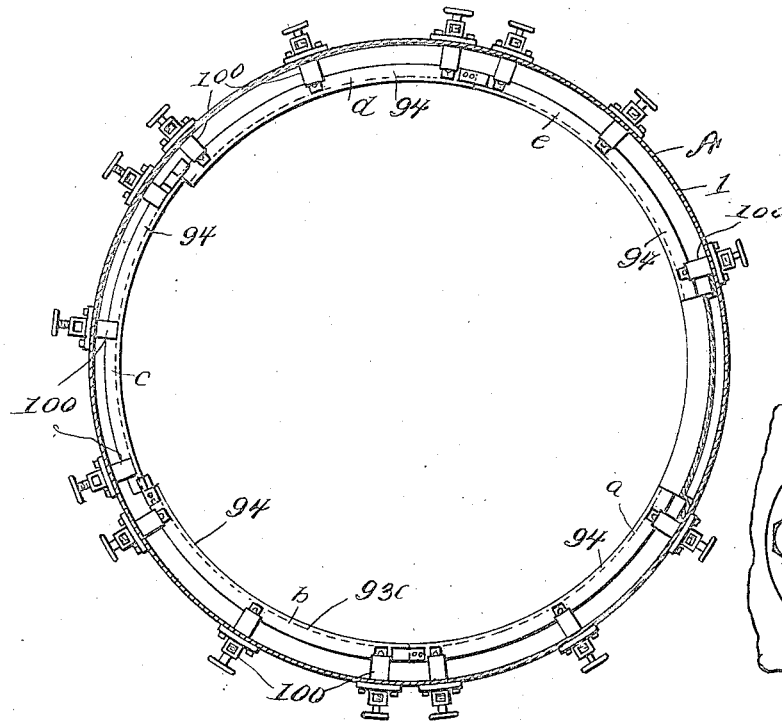
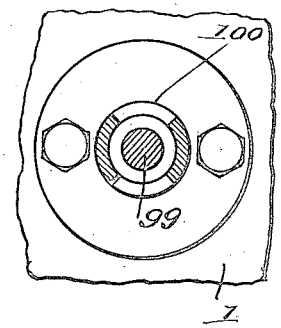
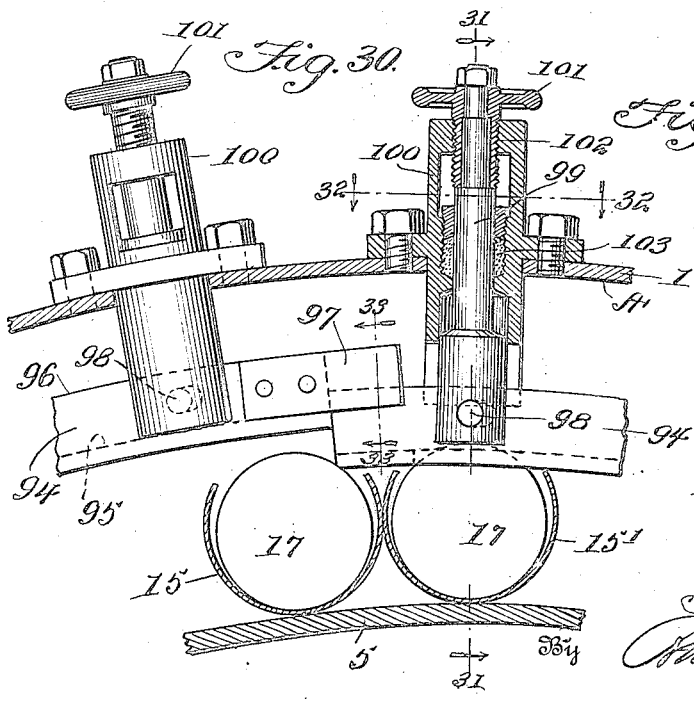
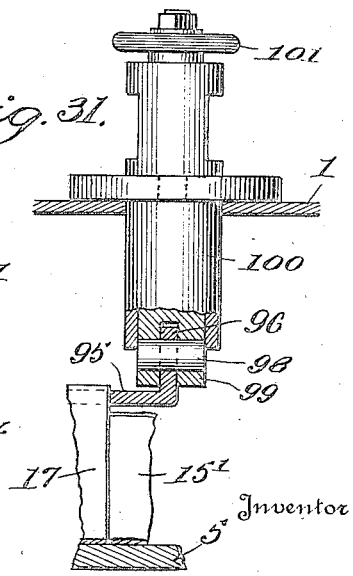

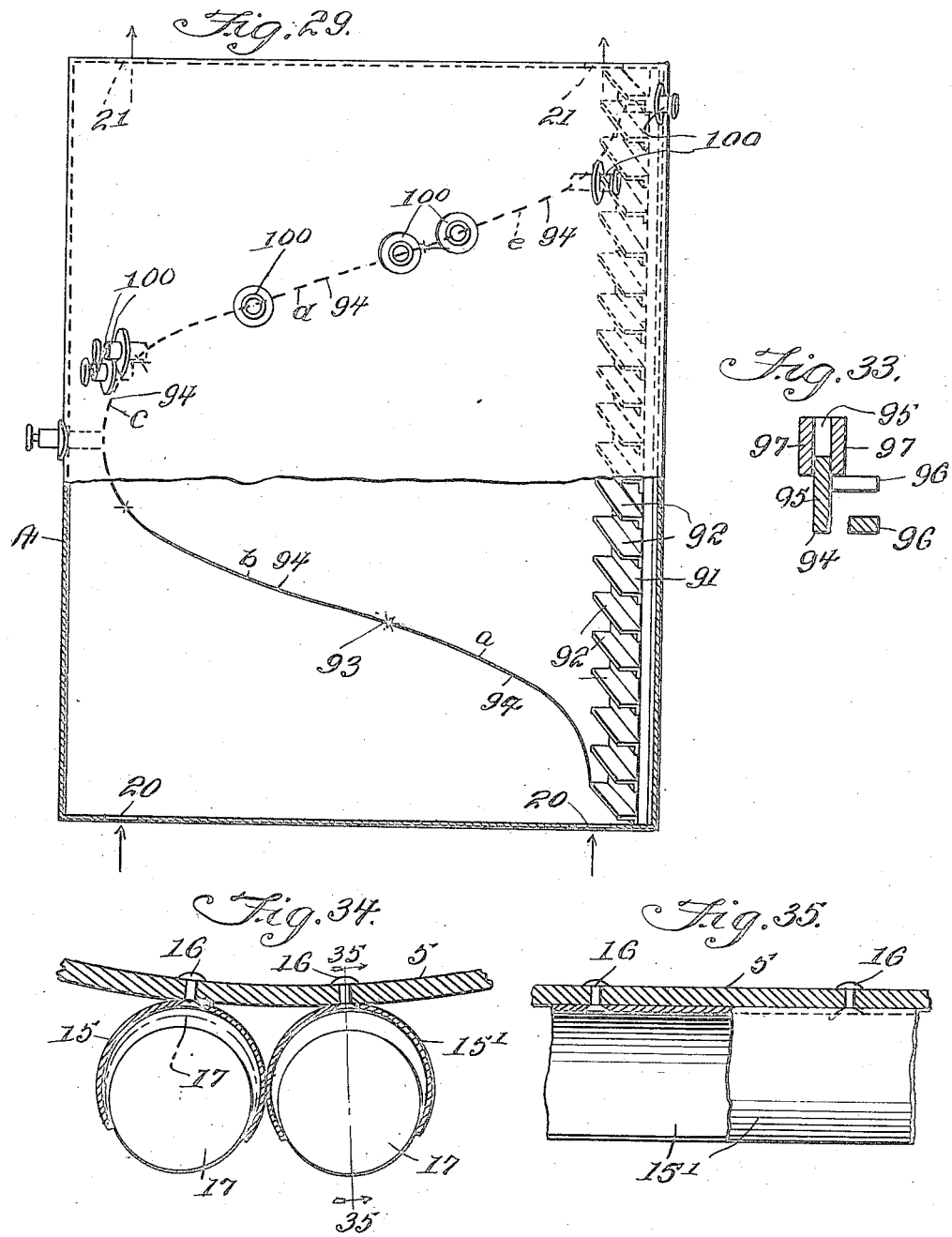

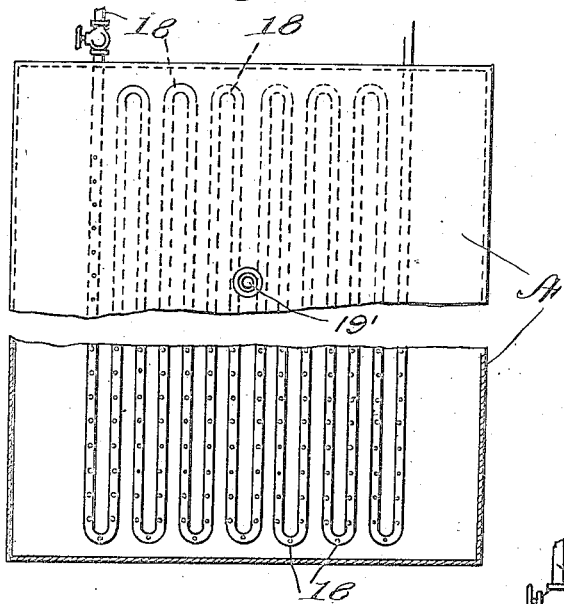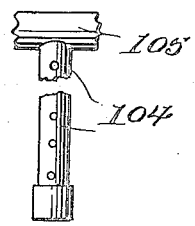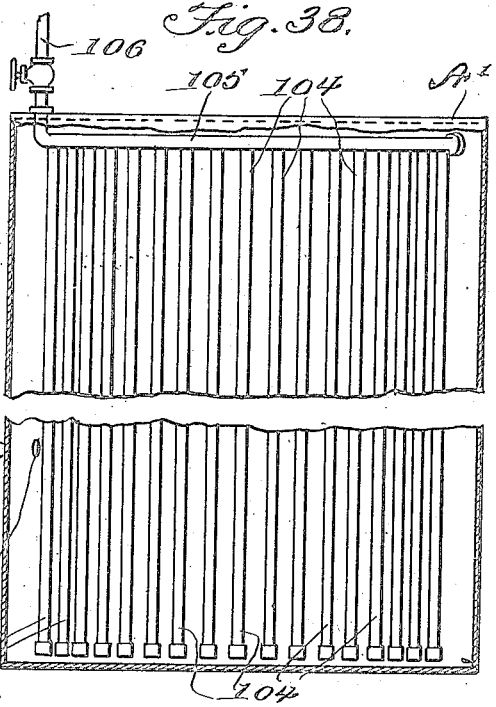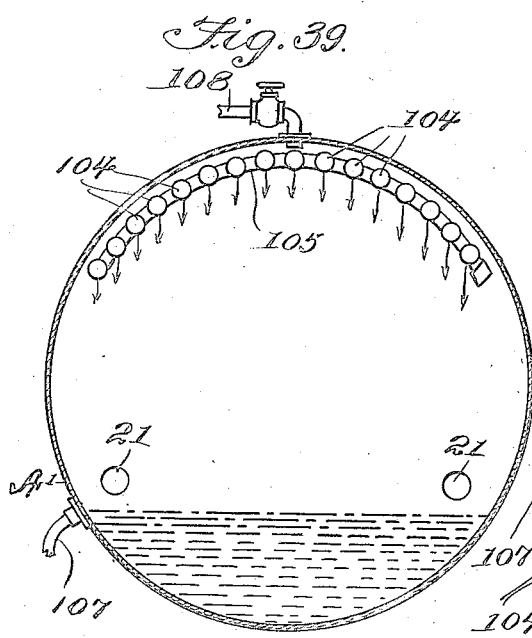

1,449,246

UNITED STATES PATENT OFFICE.

ALEXANDER K. RARIG, OF OAKLAND, CALIFORNIA.

PRESSURE COOKER AND COOLER.

Application filed August 30, 1922. Serial No. 585,325.

*To all whom it may concern:*

Be it known that I, ALEXANDER K. RARIG, a citizen of the United States, residing at Oakland, in the county of Alameda and State of California, have invented new and useful Improvements in Pressure Cookers and Coolers, of which the following is a specification.

This invention relates to an apparatus for cooking fruits, meats, vegetables and other sealed canned goods under steam heat and pressure, while the contents of the cans are being properly conducted through a course of travel and agitated en transit, and for cooling the cans upon the completion of the cooking operation and prior to their exit from the apparatus.

In the canning industry the old style open vat (water cook) process has been largely superseded by the pressure process, i. e., the process of cooking the foodstuff already packed in the cans by steam treatment in a closed cooker, the temperature of the steam varying from 212° to about 260° F., according to the degree of heat and time required to cook various kinds of food stuffs. Under present conditions two styles of cookers are required to meet the demands, to wit, the stationary retort used for cooking food products that require high temperatures, 220° to 260° F., and a long time cook, such as fish, shrimp, meat and certain vegetables, as spinach, corn, peas, olives, etc., and the continuous agitating cooker (with cooler attachment) used for cooking food products that do not require so much time or a temperature in excess of 212° F., such as fruits, berries, tomatoes, soups, sauerkraut, pineapples, tomato paste, etc. Inasmuch as neither of these styles of cookers can be used for general purposes, since the stationary retort cannot be employed to do the work of the continuous agitating cooker for short-time, low-temperature cooks, and the continuous agitating cooker cannot be employed to do the work of the stationary retort for long-time, high-temperature cooks, it is necessary for canning establishments equipped with one of these classes of cookers only to shut down in certain seasons, and in order to enable a canning establishment to operate continuously it is necessary to equip it with large numbers of both styles of cookers at great cost of installation and losses due to the housing and maintenance of perhaps half of the equipment of one kind or the other idle at certain seasonal periods. In both styles of cookers mentioned a material loss of steam occurs each time doors are opened for inlet and exit of goods, and it is impossible to keep the confined steam pressure and temperature constant and uniform. Because of this fact, and on account of the nature of the instrumentalities employed, the cooking period is prolonged, and, particularly in the case of the continuous agitating cookers heretofore employed, the range of travel of the cans is necessarily quite long and the apparatus consequently occupies considerable floor space and a considerable amount of steam is required to supply the cooking chamber. Such types of cooking devices, therefore, separately considered, have a limited range of usefulness, and are cumbersome and costly in construction and operation, occupy a large amount of floor space, have a limited out put in proportion to size, and are comparatively wasteful in these respects and uneconomical in operation.

The general object of my invention is to provide an apparatus which overcomes these objections to prior cookers, and which, therefore, combines all the working advantages without being subject to the disadvantages, of both the stationary retort and the continuous agitating cooker heretofore in use, and hence embodies an apparatus adapted for cooking all kinds of food substance at high and low temperature ranges and to operate efficiently at all temperatures between 212° and 260° F., and to cook the food product for any period required.

A further object of the invention is to provide a compact type of apparatus occupying a comparatively small amount of floor space, which embodies means for holding a maximum number of cans within a heating chamber of comparatively small dimensions and for sealing said chamber against the escape of steam at all times, thereby preventing waste of steam and enabling temperatures and pressures to be accurately and uniformly governed and maintained, and which provides for governing the range of travel of the cans to suit any cooking period required.

Still further objects of the invention are to provide a machine for general use which is strong, durable and comparatively inexpensive of construction, which is practically automatic and highly economical in operation, which is positive, certain and reliable in action, which may be employed for operating upon cans of different sizes, which is adapted for the cooking of cans containing two different food products and separately delivering the same, and which includes a cooler of novel and efficient construction operating in unison with the cooker for cooling the cans delivered therefrom.

With these and other objects in view, which will appear in the course of the subjoined description, the invention consists of the features of construction, combination and arrangement of parts, hereinafter fully described and claimed, reference being had to the accompanying drawings, in which:—

Figure 1 is a front elevation of a pressure cooker and cooler constructed in accordance with my invention.

Figure 2 is a sectional plan view thereof taken substantially on line 2—2 of Figure 4.

Figure 3 is a side elevation, with parts broken away and in section, of the forward portion of the cooker and parts of the operating mechanism adjacent thereto.

Figure 4 is a vertical transverse section through the cooking drum, some of the cans appearing in shaded lines to illustrate their shifting action.

Figure 5 is a fragmentary interior view of the cooking drum, looking toward the fixed shifter tracks, showing diagrammatically in dotted lines the movements of the cans in being shifted thereby.

Figures 6 and 7 are detail views illustrating working portions of the rotary drum actuating dog and drum actuating wheel.

Figure 8 is a top plan view of the rotary dog.

Figure 9 is a view of the mutilated gears for periodically rotating and reversing the rotary and reciprocatory can injectors and ejectors.

Figures 10, 11, 12 and 13 are plan views of a portion of the can feed devices, showing the successive steps of operation thereof.

Figures 14, 15 and 16 are views of the cam mechanism for oscillating the can feed fingers, showing the cam in different working positions.

Figures 17, 18, 19 and 20 are views of the cam for reciprocating the said can feed fingers, showing such cam in different working positions.

Figure 21 is a detail section showing the mounting of one of the cranks for oscillating the can feed rods or shafts.

Figure 22 is a longitudinal section through one of the feed or discharge port governing valves and the associated can injector or ejector.

Figure 23 is a transverse section thereof on line 23—23 of Figure 22.

Figure 24 is a detail section through the partition head of an injector or ejector valve on an enlarged scale.

Figure 25 is a view looking toward one side of said partition head.

Figure 26 is a cross-section through one journal of an injector or ejector valve, showing the valve in side elevation.

Figure 27 is a fragmentary side elevation looking toward the inner side of an injector or ejector valve casing.

Figure 28 is a section through the drum and a side elevation of the sectional helical track shifter omitted from the main views for clarity of illustration.

Figure 29 is a plan view of the cooking drum, partly in horizontal section, showing the fixed helical can shifter and illustrating diagrammatically the arrangement of the sectional adjustable helical shifter track sections about the drum and with relation to said fixed shifter.

Figure 30 is a detail transverse section through the cooking drum showing adjacent ends of two adjustable helical shifter track sections with one of said sections adjusted for can shifting action.

Figure 31 is a sectional elevation taken substantially on line 31—31 of Figure 30.

Figure 32 is a detail section on line 32—32 of Figure 30.

Figure 33 is a detail section on line 33—33 of Figure 30.

Figure 34 is a detail section through the cooking drum and two adjacent can retainers showing capability of retainers for holding large and small cans.

Figure 35 is a sectional elevation taken substantially on line 35—35 of Figure 34.

Figure 36 is a diagram showing arrangement of the heating coil within the cooking drum.

Figure 37 is a detail view of one of the cooler pipes.

Figure 38 is a vertical-front-to-rear section on a reduced scale through the cooler, showing the cooling means, other parts being omitted.

Figure 39 is a vertical transverse section of the same.

In the illustrated embodiment of my invention herein disclosed, A and A' designate cooking and cooling devices arranged one in advance of the other and each comprising a drum or cylinder 1 having a rear wall 2, detachably secured in position, as by bolts or other fastening means 3, to permit of convenient assemblage and disassemblage of parts and access to the drum or cylinder whenever occasion requires for cleaning, repairs or other purposes. A carrier supporting shaft 4 extends centrally and longitudinally through both drums and has fixed thereto, within each drum, a can carrier wheel 5. The shaft 4 is journaled in bearings 6 on the front and rear walls or heads of the drums, and each bearing 6 is provided with a flange plate 7 secured to the drum wall and with a stuffing box 8 with which is associated a movable gland or follower 9. The box 8 is formed with notched guide lugs 10, and bolts 11 engage the notches in said lugs and have threaded ends passing through the plate 7 and follower 9 and provided with fastening and adjusting nuts 12. These stuffing boxes seal the journals against the escape of steam therethrough and by adjustment of the nuts the glands and packings may be tightened up whenever needed. A hand-hole 13 is provided in each of said cylinder walls to allow access to the internal parts of the packing, which hand-hole is normally closed by a cover plate 14.

Mounted upon the periphery of each carrier wheel 5 are can retainers 15—15', each comprising a channeled or trough-shaped resilient sheet-metal body extending from side to side of the wheel, said body being closed at its inner side and open at its outer side and each end. At their closed sides the retainers are suitably fastened to the wheel, as by bolts or rivets 16, the sides of the retainer being free to receive and more or less yieldingly embrace the cans 17 entered therein. In cross-section each retainer is U-shaped or of more or less elliptical form, extending on an arc somewhat greater than a half-circle, its open outer side being contracted to less than the diameter of the smallest-sized can to be treated in the machine. This form of retainer provides for the reception of cans of two or more different sizes (diameters), as shown in full and dotted lines in Figure 34, and at the same time allows the cans held therein to be slid endwise or longitudinally along the retainers, across the periphery of the carrier wheel, without liability of clogging or binding. The shape of the retainer, in any event, is such as to not completely enclose the can but to permit it to project partially beyond the open side of the retainer, for a purpose presently described. The retainers on the carrier wheels of the cooker and cooler are the same in number and arrangement, and in each case, the retainers 15 and 15', which are alike in construction, alternate in arrangement around the carrier wheel. This arrangement of two alternating series, rows or groups of containers 15—15' provides for a spacing of the containers to cooperate with two sets of can feeders and ejectors, whereby a simple, reliable and efficient can feeding and discharge action is obtained, and whereby, further, the machine is adapted to feed two sizes of cans or cans containing two different kinds of food products to be cooked, and to keep the same separate and discharge the same from separate outlets.

Steam at any determined cooking temperature, and resultant pressure, is supplied to the interior of the drum of the cooker A, from a suitable source, through a perforated heating coil 18, preferably located in the base portion of said drum. A suitable drain pipe or outlet 19 is provided for the discharge of water of condensation, which may be allowed to rise to the maximum level line $x$—$x$ (Figure 4) before discharge, which pipe may be suitably constructed and arranged for the discharge of the water, and a vent valve 19' is provided at the top of the drum for the discharge of air therefrom.

The front walls of the cooking and cooling drums are provided on opposite sides of the vertical centers of said drums with can feed inlets 20, and the rear walls of said drums are provided with can discharge outlets 21, the respective inlets and outlets at each side of the vertical center of the drums being in alinement with each other. The inlets and outlets 20—21 on the left hand side of the vertical centers of the drums are employed for the inlet of the cans to and their discharge from the can retainers 15, while the inlets and outlets 20—21 at the right hand side of the vertical centers of the drums are employed for the inlet of cans to and their discharge from the can retainers 15'. Associated with each can feed inlet is a can feed device 22, and associated with each outlet is a can discharge device 23. Also associated with each inlet and outlet is a valve device, generally indicated at 24, serving also as a can injector or ejector, as the case may be, the valve devices between the drums A—A', and extending between similarly arranged and alined inlet and outlet openings in the adjacent rear and front walls of the respective drums, serving also as combined ejectors and injectors for transferring the cans from one drum to the other. These feed and discharge devices, the structural features of which I will now proceed to describe, are driven in timed accord with each other and with the can carrier wheels in the drums through mechanism operated from a common source of driving power.

The feed and discharge devices 22 and 23, arranged in duplicate at each side of the machine for coaction with the associated drum inlets and outlets, consist of fingers mounted upon shafts 25. Each shaft 25 is mounted for lateral oscillating as well as back and forth sliding or reciprocating movements. The shafts are coupled for rocking or oscillatory movements inwardly or outwardly in unison by connecting rods 26—27 and a centrally pivoted lever 28, to the reversely extending or opposite ends of which the rods are attached. Lever 28 carries a friction roller 29 which engages an annular cam groove in a rotary cam 30 mounted on a transverse transmission shaft 31 provided at the front of the machine. The cam groove is provided with high portions 32 and 33 and intervening low portions, the high portions operating successively on each revolution of the cam to rock the shafts in the proper directions to throw the fingers into and out of can feeding and discharging positions. The can feed fingers are arranged at the front of the machine in position to move into and out of the path of cans presented for introduction through the front injector valves, while the can discharge fingers are arranged within the drums in position to be moved into and out of the path of the cans presented by the carrier wheels for delivery through the can outlets in the drums. When the fingers are brought by the inward rocking movements of the shafts 25 in position to engage and impart feed motion to cans, the shafts are moved rearwardly to cause the fingers to engage and move the cans rearwardly a prescribed distance, and when this movement is completed the shafts are moved forwardly back to normal position and then rocked outwardly to swing the fingers backward to normal position, out of the line of travel of the succeeding cans approaching the drum inlets and outlets. The means for reciprocating or sliding the shafts 25 back and forth comprises a second cam 34 on shaft 31, for transmitting back and forth rocking motion to arms 35 having yoked upper ends slidably and pivotally coupled to the shaft 25, said arms being united at their lower ends by a transverse rock shaft 36. One of said arms 35 carries a friction roller 37 engaging groove 38 of quadrantal form in the cam 34, said groove including portions 39 and 40 at different distances from the cam axis, whereby on each revolution of the cam the shafts will be slid rearwardly on their working motion and then slid forwardly or back to normal position. As shown in detail in Figure 21, each rod 26—27 is indirectly coupled to the shaft 25 with which it connects by a crank arm 41, pivoted at its lower end to the rod and carrying at its upper end a bearing sleeve 42. Sleeve 42 turns in a bearing opening 43 on a fixed part of the machine and receives the associated shaft 25 which passes through it. The sleeve is longitudinally grooved to receive a spline or feather 44 set in the shaft, whereby the arm 41 is coupled to the shaft to transmit rocking motions thereto, while the shaft may slide through it for reciprocating motions.

Each injector or ejector valve device 24 comprises a casing 45 having an inlet opening 46 at one (its outer) side and an outlet opening 47 at its diametrically opposite (inner) side. This casing is also provided at one or both sides with an attaching plate 48. The devices 24 located at the front of cooker A serve as injectors which receive the cans from a source of supply and deliver the same to the inlet ends of the retainers 15—15' in the cooker drum. In this case the attaching plates 48 are fastened to the front wall of the cooker drum and fit within the openings 20 to dispose the outlets of the injectors in line with the said openings. In the case of the devices 24 at the rear of cooler drum A' the construction is the same except that the openings 46 and 47 are relatively reversed for application of the plates 48 to the rear wall of said drum, the openings 47 thus serving as inlets to receive the cooled cans discharged from the cooler, while the openings 46 serve as outlets for the final ejection of the cans from the apparatus. The devices 24 located between the drums A—A' have attaching plates 48 at each end, whereby they are fastened to the adjacent walls of said drums in line with the outlets 21 of the cooker drum and inlets 20 of the cooler drum, the cans being received from the cooker drum into the intervening devices 24 through the openings 46 and delivered into the cooling drum through openings 47. The casing 45 has a circular body wall 49 forming a seat for a combined rotary valve and feeder 50 having a circular wall forming a valve member to engage the seat wall 49. Extending diametrically through the rotary member 50 is a passage 51 sub-divided by a partition 52 to form opposed chambers 53 and 54 alternately serving as receiving and discharging compartments. The valve member 50 is periodically rotated a half revolution on each operation to bring the said compartments 53 simultaneously and alternately into alinement with inlet and outlet openings 46 and 47 in the casing 45. Fitted in the passage 51 is a reciprocating feeder proper, comprising plunger or piston heads 55 and 56 operating in the respective compartments 53 and 54 and connected for movement in unison by a rod 55', working through a suitable type of packing or stuffing box 57 in the partition 52, whereby leakage of steam through the partition between said compartments is prevented. The casing 45 is provided at one side with a detachable head 58, provided with steam inlet and exhaust ports 59 and 60 communicating with steam inlet and exhaust pipes 61 and 62, and the partition 52 is provided with ports 63 and 64 communicating with the respective chambers 53 and 54, which ports 63 and 64 are adapted for cooperation with ports 59 and 60, in the movements of the rotary valve member 50 to alternately serve as steam supply and exhaust passages. The rotary valve member 50 is provided with journals 65 and 66 having bearing in the walls of the casing 45, and the valve devices at the front of the cooking drum, between the cooking and cooling drums and at the rear of the cooking drum are coupled in pairs for movement in unison by transverse shafts 67. Each of these transverse shafts 67 is provided at one end with a mitre gear 68, and the mitre gears 68 of the several shafts 67 engage similar gears 69 on a longitudinally extending shaft 70, whereby all the shafts 67, and the valves actuated thereby, are coupled for movement in unison in timed accord and at the same ratio of speed. By reference to Figure 22 the operation of the combined valve device and feeder will be readily understood, this view showing a can 17 slidably entered endwise into the receiving chamber 53, in which the piston head 55 is in retracted position, and another can 17 which has been slidably expelled endwise from the chamber 54 by outward movement of the projected piston 56. As shown, the chamber 54 is in communication with the inlet 47 of the cooking drum 1, and it will be apparent therefore that by this operation, assuming a can retainer 15 or 15′ to be in registry with the opening 47, the can 17 expelled by the piston 16 will be moved into said retainer. During this operation the piston member 56 will close the opening 47 against the loss of other than a very small amount of steam from the drum. When the valve member 50 is given a half revolution in the direction of the arrow to its other working position, the positions of the compartments 53 and 54 will be reversed, and steam will be admitted to the compartment 53 behind the piston 55 to move the same outwardly while the steam will exhaust from the compartment 54 to allow the piston 56 to move inwardly. By such half revolution of the member 50, the compartment 54 is brought into receiving position at the opening 46 and the compartment 53 in discharging position at the opening 47, and the piston 55 will thereupon expel the can previously admitted into the compartment 53 and will seal the opening 47 against the escape of any appreciable amount of steam from the drum. At all other times in the operation of the rotary valve member the circular wall thereof will close the opening 45 against any but a slight escape of steam from the drum. It will be apparent, therefore, that in the operation of the apparatus the cans will be automatically fed into and discharged from the drums by devices which will, at the same time, and at all other times, substantially seal the inlet and outlet openings in the drums against the escape of steam, whereby loss of any appreciable quantity of steam through passages, in the can feeding and discharging action, will be prevented so that the temperature and pressure of the steam within the cooking drum, and the working pressure within the cooling drum, may be maintained and kept practically uniform at all times in the operation of the apparatus. The injector and ejector valve devices operate in pairs, as described, to simultaneously introduce two cans at a time into retainers 15—15′ presented at the inlets of the drum and to discharge two cans at a time from the same retainers through the outlets of the drum, the injector and ejector at one side of the vertical center of the machine operating to feed cans to and discharge cans from the retainer 15, while the injector valves at the opposite side of the vertical center of the casing operate to feed cans to and eject the cans from the other retainers 15′, whereby certain advantages in the use and operation of the apparatus are obtained, as hereinafter described.

Mounted upon the forward end of the shaft 4 is a feed wheel 71 provided with an annular series of peripheral teeth 72 and locking recesses 73 between the teeth. In the example shown, the wheel 71 is provided with thirty teeth or notches 72 and an equal number of locking recesses 73, and the carrier wheel within each drum is provided with sixty can retainers 15 and 15′, equal to double the number of notches or teeth 72 on the wheel 71. The wheel 71 is intermittently turned a distance of one tooth on each operation thereof, and is then locked in position until again turned, each movement of said wheel turning the carrier wheel a distance equal to the spaces between two can retainers, bringing a retainer 15 in line with the inlet and outlet openings at one side of the drum and a retainer 15′ in line with the inlet and outlet openings at the opposite side of the drum, cans being fed by the oppositely arranged feed fingers and feed valve devices simultaneously into the forward ends of said retainers and discharged from the opposite ends thereof, if any cans are in position for the discharging action. Intermittent motion is transmitted to the wheel 71 by means of a rotary feed dog 74 having a hub portion secured to a countershaft 75, said hub portion being formed with a cut away part or recess 76 and a circular part 77 concentric with the shaft 75. The shaft 75 carries a gear 78 meshing with a gear pinion 79 on a drive shaft 80 carrying a drive pulley 81 for receiving driving motion from any power source. The shaft 75 is constantly driven by the shaft 80 and once on each revolution of said shaft 75 the dog 74 engages one of the teeth or notches 72 of the wheel 71 and moves the same a distance of one tooth, this operation being permitted by the cut away part 76 which clears the succeeding locking recess 73, the surface 77 then coming into engagement with said succeeding recess 73 and seating therein to lock the wheel 71 against movement during the remainder of the rotation of the dog 74, by means of which each carrier wheel will be intermittently turned a distance corresponding to distances between two rows of retainers 15—15' at a time and then locked against movement for a definite interval until the wheel 71 is again turned by the succeeding action of the dog 74. The carrier wheel is thus designed to make a complete revolution within the drum within a definite period of time, during which period the cans in the retainers are carried around the drum, certain means being employed for shifting the cans transversely of the drum between the inlets and outlets, as hereinafter described, the shifting feed being fixed or variable, as desired, so as to regulate the cooking period.

On the countershaft 75 is a mitre gear 82 meshing with a mitre gear 83 on the shaft 31, whereby a constant driving motion is imparted to said shaft 31 to actuate the cams 30 and 34. The shaft 31 serves as a transmission shaft for actuating the fingers 22—23, the shafts 25 by which the movements of said fingers are controlled, and the valve members 50 carrying the reciprocating injectors and ejectors, at properly timed intervals. Motion is communicated from shaft 31 to the elements 50 through a mutilated gear 84 having a toothed surface 85, extending substantially half around its periphery and a plain or blank surface 86 extending around the remainder of its periphery. Gear 84 is adapted for cooperation with another mutilated gear 87 mounted on the front transverse shaft 67, which gear 87 is provided with two substantially semi-circular series of peripheral teeth 88 and 89 and intervening untoothed and recessed locking portions 90. Figure 9 shows in detail the construction of these gears 84 and 87, and shows the toothed surface 85 about to engage the toothed surface 88 after an interval of rest during which portion 86 of gear 84 has been in engagement with one of the portions 90 of gear 87, thus holding the gear 87 stationary while the gear 84 has been making an idle half revolution. During this period of rest of gear 87, the valve members 50 are maintained in fixed position for the operation of the pistons 55 and 56 at a time when the carrier wheel is stationary, one piston chamber being in position to receive a can 17 while another can is being discharged into a carrier wheel can retainer from the other piston chamber. The gear surface 85 then comes into mesh with gear surface 88 and turns gear 87 a half revolution, thus reversing the piston of the piston chambers 53 and 54 of all the valve devices 50, whereupon surface 86 of gear 84 comes into contact with the other surface 90 of gear 87 and locks the valve devices in such position. The valve devices 50 are thus actuated once on each complete revolution of the gear 84 for can receiving and shifting actions and locked against movement during a time period of one half a revolution of said gear 84, during which time period the can feeding and discharge fingers 22 and 23 are operated and the carrier wheels turned a distance of one tooth of wheel 71, said parts being moved in timed relation and the fingers 22 and 23 being actuated during the time periods of rest of the carrier wheel.

Arranged upon one side of each drum is a stationary can shifting device 91 having flanges 92 forming track rails spaced apart distances equal to the spaces between circumferential rows of cans in the retainers 15—15' on the carrier wheels. The shifter 91 of each drum extends from front to rear of the drum across the periphery of the carrier wheel, and the flanges or tracks 92 are inclined in the nature of spiral blades, having a determined pitch for shifting the cans in the retainers across the carrier wheel a distance of one circumferential row on each revolution of said wheel. By this means the cans in the retainers are moved across the carrier wheel between the drum inlets and outlets at a fixed ratio determining the maximum cooking or cooling period, which may be that necessary for cooking the most refractory food products at the highest steam pressure and temperature commonly employed. This fixed shifter may be used in cookers designed to have a fixed feed ratio and fixed cooking period, and such a shifter may be advantageously employed alone for a can shifting action in the cooling drum. I however provide in the cooking drum a can shifter having a variable can shifting action, which shifter is shown in detail in Figures 28 to 32, inclusive, and omitted from the remaining figures for greater clarity of illustration. This variable type of can shifter 93 is in the form of a sectional helical blade, track or flange extending around the interior of the cooking drum between the terminals of the fixed shifter 91, portions or sections of said helical shifter thus being disposed at different points in the path of feed of the cans from front to rear of the drum and across the periphery of the carrier wheel. The track 93 is composed of any suitable number of sections or divisions 94 which are normally disposed in an inoperative position and out of the path of the outwardly projecting portions of the cans 17, but are separately adjustable inwardly to engage the projecting portions of the cans for transmitting shifting motion to the cans. Each track section 94 is made of angle metal having a horizontal web 95 to engage the cans and a vertical web 96. The ends of the track sections are provided with guide members 97 to overlap the ends of adjacent track sections, so as to properly support and guide said track sections in their movements. The web 96 of each track section is pivotally coupled, as at 98, by a slot and pin connection, with an adjusting device comprising a radially movable rod or plunger 99 fitted for sliding movements in a casing 100 extending outwardly through an opening in the drum shell and suitably secured thereto, said plunger 99 being adjustable inwardly and outwardly by a hand wheel 101 having a threaded engagement with the casing 100 as at 102, by means of which the track section 94 may be moved forwardly and backwardly between normal or retracted and working positions. Any other suitable adjusting means for the track sections may, however, be employed. The casing 100 is provided with a suitable stuffing box or packing 103 to prevent leakage of pressure therethrough from the drum. By means of these adjusting devices any one, or any number or all of the track sections 94 may be adjusted inwardly to working positions to engage the portions of the cans projecting from the retainers 15—15'. By projecting one of the tracks 94 for cooperation with the fixed shifter 91, these shifters will jointly operate in the revolution of the carrier wheel to shift the cans toward the outlet, thus giving the cans a faster rate of feed motion and correspondingly reducing the time period of the cook without diverging the cans from one retainer to another or varying the normal course of travel of said cans. By adjusting two or more of the track sections 94 inwardly, the rate of travel of the cans toward the outlets will be correspondingly increased, in proportion to the number of track sections 94 used, thus enabling the time period of travel of the cans between the inlets and outlets to be varied as desired and the cooking period to be correspondingly varied. By proper setting of the shifting devices, therefore, the operation of the cooker may be accurately and definitely controlled for any cooking time period between that required for cooking the most easily cooked food products and that required for cooking the most refractory food products, and a proper adjustment of the helical track sections will set the cooker for any time period of cook, in which the operation will be automatic from start to finish, without requiring the attention of the operator. Of course, the amount and temperature of steam supplied to the cooker will be such as that required for cooking any food stuff within a determined period, and in practice the feed of steam may be either manually or automatically controlled.

Any suitable cooling means may be employed for cooling the cans being conveyed around and through cooler drum A'. In the present instance I have shown a water sprayer arranged to arch over the carrier wheel and comprising perforated spray pipes 104 connected with a header 105 communicating with a valved water supply pipe 106. Cooling water, at a suitable low temperature, may thereby be supplied to flow down over the cans and abstract the heat therefrom. The water flowing down over the cans may be allowed to collect in the form of a pool in the bottom of the drum A' up to the level of the overflow pipe 107, which is below the level of the inlets and outlets 20—21. The lower portion of the carrier wheel passing through this pool causes the cans carried thereby to be temporarily submerged on their travel through the pool, thus increasing the efficiency of the cooling action. A valved air supply pipe 108 is provided whereby compressed air, at any required pressure, may be supplied to the interior of drum A' to keep the pressure on the interior of the drum approximately equal to the pressure on the interior of the cans being cooled, thereby preventing the cans from bulging or bursting.

In the operation of the apparatus, the cans, previously filled and sealed with the food stuff to be cooked, are fed or supplied in any suitable manner for admission through the feeders at the front of the cooking drum. The receiving compartments of the valved feeders 24 at the front of the cooker being in position to receive cans, at the outset of the operation the grooved portion 32 of cam 30 operates to cause the feed fingers 22 to be moved inwardly behind the cans presented for admission to the valved feeders. In such position of the parts, shafts 25 are in their forward position. Grooved portion 39 of cam 34 then operates to slide the shafts 25 rearwardly, thus causing the fingers 22 to slidably feed the cans endwise as presented into the receiving compartments of the valved feeders 24. After this operation is completed, groove portions 33 and 40 of the respective cams 30 and 34 come into action in timed accord to swing the fingers 22 backwardly to retracted position and to slide the shafts 25 forwardly, thus resetting the fingers 22 and cooperating parts for the succeeding feed action. Gear 84 has by this time turned to bring its toothed portion 85 into engagement with toothed portion 88 of gear 87, thereby imparting a half revolution to shaft 67, at the end of which surface 86 comes into engagement with the proper recess 90 to lock gear 87 against further rotation. Through this half revolution of shaft 67, valve member 50 is given a half revolution to bring the receiving compartment, as the compartment 53 therein, into registry with the opening 47, while the other compartment 54 is reversed as to position and moved to the receiving position previously occupied by compartment 53. The sets of feed devices at opposite sides of the front of the cooking drum are simultaneously operated in the manner described, during which time the can carrier wheel in the cooker remains at rest, one can retainer of the series 15 and one can retainer of the series 15' being held in registry with the openings 47 of the valve feeders to receive cans from the compartments 53 thereby brought into delivery position. Movement of cam member 50 to the position described, causes port 64 associated with feed piston 55 to be brought into registry with exhaust outlet 60 and port 63 associated with piston 56 to be brought into registry with the steam feed port 59, whereby steam will be supplied to the compartment 54 behind the piston 56 to move said piston to discharge position. Pistons 56 of the two valved feeders thus slidably move the cans from compartments 54 into the receiving retainers 15 and 15', valves 56 during such operation closing ports 47 against the escape of steam. Movement of compartment 53 inwardly to discharging position causes compartments 54 to be moved outwardly to receiving position for the setting of the valve feeders for actuation in the next cycle of operation under engagement of toothed surface 85 of gear 84 with toothed surface 89 of gear 87. The feed dog 74 then comes into operation to move the feed wheel 71 a distance of one tooth, said feed wheel then being locked against movement until again turned by the dog in the manner previously described. Movement of one tooth of the wheel 71 causes carrier wheel 5 to be moved a distance equal to the distance between two transverse rows of can retainers thereon, as a result of which a retainer 15 will be presented to receive a can from the valve feeder 24 at one side of the cooker drum while a retainer 15' will be presented to receive a can from the valve feeder at the opposite side of the cooker drum, retainers 15 skipping one valve feeder and retainers 15' the other valve feeder in the turning motion of the carrier wheel in the manner described, as will be readily understood. Carrier wheel 5 is then held fixed until again actuated by the movement of wheel 71, during which period the feeders operate in the manner previously described. On each intermittent movement of the carrier wheel 5, the fixed shifter 91 comes into operation to shift the cans 17 held in the retainers a distance of one circumferential row toward the outlet end of the drum, thus progressively moving the cans toward the outlets 21. When cans on the wheel 5 reach a position for discharge through the outlets 21, the fingers 23 operate during the feed motion of fingers 22 to force cans in position for discharge through openings 21 into the receiving compartments of valve feeders 24 between the two drums, which act thereafter to feed the cans into the retainers of the carrier wheel 5 in the cooling drum A', the fixed shifter 91 in said drum A' feeding the cans toward the outlets of said drum, the cans being discharged through the outlets of the drum by the set of fingers 23 therein into the valve feeders 24 at the rear of said drum, from which they are finally discharged onto conveyors or into suitable receptacles. The cooler A' may and preferably will have a fixed cooling period, so that a fixed shifter 91 may be employed therein, and a fixed shifter 91 alone may be used in the cooker drum A' in the event that said drum is designed and used only for cooking certain food stuffs requiring a fixed and invariable cooking period. By the use of the helical variable feeder, however, the ratio of feed of the cans between inlets and outlets of the cooker drum may be varied as desired, for long, short or medium time cooks, or cooks of any given period, thus enabling all kinds of food stuffs to be cooked in one and the same cooker within minimum and maximum pressure cooking ranges, whereby the cooker is adapted for general use in the cooking of all kinds of food stuffs falling within the cooking range of both the continuous agitating cooker heretofore employed and the retort cooker, without any change except a supply of the steam at the proper temperature and pressure and the adjustment of the sections of the variable helical feeder to regulate the time period of travel of the cans which governs the cooking time. The operation of this variable helical can shifter has been previously described, so that a further description thereof is unnecessary. The operation of the cooler will also be fully and clearly understood from the foregoing description.

It will, of course, be understood that food stuff contained in the cans is properly agitated to facilitate the cooking action in the movements of the cans with and around the carrier wheel and across the periphery of said wheel.

It will accordingly be seen that my invention provides a cooker which is adapted for cooking all kinds of food stuffs, at any predetermined steam pressure and temperature, inasmuch as the cooker is at all times sealed against the loss of any appreciable amount of steam pressure and temperature, and hence the temperature and pressure may be maintained at accurate working degrees, and for the further reason that the ratio of travel of the cans between the inlets and outlets may be regulated or varied to suit the time period of the cook. By reason of the reliable and efficient reduction of steam temperature and pressure, the cooker may be made quite short and compact, and the variable shifting action described is permitted because of the resulting comparatively short distance between the inlets and outlets of the drum. My invention therefore provides a cooker which saves floor space, reduces the cost of construction and installation and ensures reliability and efficiency in the cooking action and economy in the use of steam, as well as in all other factors relative to operation and maintenance of the apparatus in good working condition. The apparatus, being adapted for general use, takes the place and performs all the combined functions of an ordinary continuous agitating pressure cooker and a retort cooker, saves large amount to the canner in the installation and maintenance of machinery and enables the canner, through the use of a single set of apparatus, to operate at all seasons and on all classes of goods. It will be observed that, in all the described operations of handling the cans, the cans are slidably moved endwise or lengthwise through the inlet and outlet openings and into and along the retainers by means of the various feeders; also that the cans are yieldingly held in the resilient retainers which are free to accommodate themselves to any protuberances or irregularities of surfaces which may occur, as in the case of dented or misshaped cans. The sliding feed motion of the cans referred to, in contradistinction to a rolling motion, prevents any choking or binding of the cans at any point, which is liable to occur, particularly in the case of misshapen cans, when a rolling feed motion is employed. A smoothness of action, with freedom from liability of the cans binding or clogging, is thus secured, which is promoted by the resilient construction of the retainers, which will allow even a badly misshapen can to travel without interference and without liability of binding. Furthermore, the sliding motion of the cans ensures less liability of possible damage to the cans in transit through endwise pressure applied thereto than a rolling motion in which endwise pressure is applied thereto, on account of the greater strength of the end portions or heads of the cans. This provision for ensuring easy feed motion of the cans, and avoidance of the liability of the cans choking in the carriers is important, as any jamming of the cans in the carriers to an extent sufficient to stop the feed motion of the cans would require stoppage of the apparatus and its disassemblage in order to remove the cans and break the jam, at a cost of the loss of considerable time and labor and a decrease in production on account of the shutting down of the apparatus. These and other advantages arising from my invention will be readily understood, without a further and extended description, by those versed in the art.

While I have herein set forth the use of steam as the heating fluid for the pressure cooking action in the heating drum it is to be understood that the invention is not limited thereto, as any equivalent heating fluid, such as air or gas, may be used in lieu thereof.

Having thus fully described my invention, I claim:—

1. In an apparatus of the character described, a drum having inlets and outlets, a rotary can carrier in said drum provided with an annular series of transverse peripheral can retainers adapted for registry with said inlets and outlets at points in the rotation of the carrier, each retainer comprising a channeled body having relatively movable side walls adapted to yieldingly engage and hold the cans therein, and means for rotating said carrier.

2. In an apparatus of the character described, a drum having can inlet and outlet openings in opposed walls thereof, a rotary carrier in said drum provided with an annular series of can retainers extending transversely of the periphery thereof and adapted for registry with said inlets and outlets at points in the rotation of the carrier, each of said can retainers comprising a channeled body of partially circular form in cross-section and adapted to slidably receive and extend sufficiently around the body of a can to hold the same therein, said retainer having relatively yielding resilient side walls, and means for imparting rotary motion to the carrier.

3. In an apparatus of the character described, the combination of a vertically disposed drum having an inlet in its front wall and an outlet in its rear wall, valves controlling said inlet and outlet, a horizontally disposed shaft journaled in said walls of the drum, a rotary carrier mounted on said shaft, an annular series of fixed transverse can holding channels on the periphery of the carrier adapted to be brought by the rotation thereof into registry with said openings, said channels being adapted to embrace and slidably hold the cans therein, a feed wheel upon said shaft, means for intermittently turning said wheel and locking the same against rotation between intervals of operation, means for opening and closing the valves of the inlet and outlet at timed intervals, injector means for slidably inserting cans through the inlet opening and its valve into the channels, means for slidably ejecting the cans from the channels through said outlet opening and its valve, and means for operating said injectors and ejectors in timed relation to the movements of the valves.

4. In an apparatus of the character described, a drum having vertically disposed front and rear walls, said front wall being provided with inlet openings on opposite sides of its vertical center and said rear wall having correspondingly arranged outlet openings, a horizontally disposed shaft journaled in said walls, a rotary carrier within the drum and mounted on said shaft, an annular series of alternately arranged channels extending transversely of the periphery of the drum and adapted to respectively register with said inlets and outlets at points in the path of revolution of the drum, gearing for intermittently turning the carrier a distance equal to the distance between two transversely disposed can retainers on each movement thereof and for locking said carrier between intervals of operation, separate and independent feed devices for slidably injecting cans endwise through the inlet openings into the can retainers, sets of separate and independent ejector devices for slidably ejecting the cans from the retainers through the outlet openings, and means for operating the said feed wheel and injectors and ejectors in timed accord.

5. In an apparatus of the character described, a drum having inlets and outlets, a rotary carrier wheel in said drum, can retainers on the carrier wheel adapted to register with said inlets and outlets and to slidably receive cans fed therein, independent reciprocatory feed devices respectively associated with the inlets and outlets for respectively injecting cans through the inlet into the retainers and discharging cans from the retainers through the outlet, and means for conjointly operating said independent reciprocatory feed devices.

6. In an apparatus of the character described, a drum having inlets and outlets, a rotary carrier wheel in said drum, can retainers on the carrier wheel adapted to register with said inlets and outlets, can feeding and discharging means including combined oscillatory and reciprocatory feeders respectively associated with the inlet and outlet, and means for conjointly operating said oscillatory and reciprocatory feeders.

7. In an apparatus of the character described, a drum having inlets and outlets, a rotary carrier wheel in the drum, can retainers on the carrier wheel adapted to register with said inlets and outlets, valves controlling said inlets and outlets, reciprocatory feeders associated with said valves, combined oscillatory and reciprocatory feeders movable laterally into and out of alinement with and toward and from the valved inlets and outlets, and means for operating the valves, reciprocatory feeders and combined oscillatory and reciprocatory feeders in timed accord.

8. In an apparatus of the character described, the combination of a drum having a plurality of sets of cooperating can inlets and can outlets, means for supplying fluid pressure to said drum, a rotary carrier within the drum, can retainers upon the carrier arranged for cooperation with the inlets and outlets, two sets of feeding devices for introducing cans from separate points of supply at different points in the drum through the inlets into the retainers and discharging the cans from the proper retainers through the coacting outlets, means for intermittently rotating the carrier so as to bring certain retainers in registry with certain inlets and outlets and other retainers in registry with the other inlets and outlets in the rotation of the carrier, and means within the drum for shifting cans along the retainers toward the outlets.

9. In an apparatus of the character described, a drum having a plurality of sets of separate can inlets and outlets, means for supplying fluid pressure to the drum, an intermittently operable rotary carrier within the drum having sets of transverse retainers across the periphery thereof arranged for cooperation with the separate sets of inlets and outlets, means for intermittently rotating the carrier to bring the sets of retainers into respective alinement with their coacting inlets and outlets, means for introducing cans through the inlets and discharging cans through the outlets, and means for shifting cans along the retainers toward the outlets in the rotation of the carrier.

10. In an apparatus of the character described, the combination of a drum having two sets of coacting inlets and outlets, means for supplying fluid pressure to said drum, an intermittently operable rotating carrier within the drum, two sets of alternating can retainers upon the drum for cooperation respectively with the sets of inlets and outlets, means for intermittently rotating the drum so as to cause the retainers cooperating with one set of inlets and outlets to register therewith and to skip the other inlet and outlet, means for feeding cans through the inlets into the containers registering therewith and discharging cans from the retainers through the cooperating outlets, and means for shifting the cans across the carrier along the retainers toward the outlets.

11. In an apparatus of the character described, the combination of a drum having openings for admission and discharge of cans, a rotary carrier within the drum, retainers upon the carrier adapted to register with said openings, feed and discharge devices having an oscillatory movement for bringing them laterally into and out of alinement with the openings and a reciprocatory motion for moving cans with relation to said openings, and means for oscillating and reciprocating said devices.

12. In an apparatus of the character described, a drum having vertically disposed front and rear walls provided on opposite sides of their vertical centers respectively with registering inlet and outlet openings, a rotary carrier within the drum, an annular series of two sets of transversely arranged and alternating can holding guides mounted on the periphery of the carrier and adapted to respectively register with the sets of inlet and outlet openings at points in the revolution of the carrier, valves controlling said openings, injectors and ejectors associated with the valves of the inlet and outlet openings, and feed and discharge devices for each set of openings mounted to oscillate back and forth relative to said openings and to reciprocate with respect to said openings, and means for conjointly operating the carrier, valves, injectors and ejectors and feed devices in timed accord.

13. In an apparatus of the character described, a drum having front and rear vertical walls, said walls being respectively provided with inlet and outlet openings, a horizontal transverse shaft journaled in said walls, a rotary carrier within the drum and mounted upon said shaft, an annular series of transversely disposed can holding guides mounted on the periphery of the carrier and adapted to register on the movements thereof with said inlets and outlets, means acting upon said shaft for intermittently rotating said carrier, rotary valve devices controlling the inlet and outlet openings, said valves having compartments movable alternately into receiving and discharge position, reciprocatory feeders in said valves for shifting cans from the respective valve compartments through the drum openings, oscillatory and reciprocatory shafts, and feeders carried by said shafts and movable by the oscillatory movements of the shafts into and out of line with the valve compartments and operative in one direction of reciprocatory movement thereof to slide cans into the registering valve compartments, and means for operating the working parts in timed accord.

14. In an apparatus of the character described, the combination of a drum having can inlets and outlets, means for supplying fluid pressure to the drum, an intermittently movable rotary carrier within the drum, can retainers upon the carrier adapted to register with the can inlets and outlets, reciprocatory feeders for introducing cans through the inlets, and reciprocatory feeders for discharging the cans through the outlets, means independent of said feeders for shifting the cans across the carrier and toward the outlets, rotary valves for sealing the inlets and outlets between intervals of operation of the feeders and at all times thereafter, and means for intermittently rotating the carrier and conjointly reciprocating the respective feeders and rotating the valves in timed accord.

15. In an apparatus of the character described, a drum having at least two sets of separate and independent can inlets and outlets, means for supplying a treatment fluid to said drum, a carrier within the drum for conveying the cans through a course of treatment, said carrier having can holders for cooperation with the separate and independent sets of inlets and outlets, means for slidably introducing cans endwise through the inlets sliding the same endwise in the holders toward the outlets and slidably discharging the same endwise through the outlets, and means for operating the working parts in timed accord.

16. In an apparatus of the character described, the combination of a cooking drum, means for supplying steam under pressure thereto, means within the drum for conveying the cans through a prescribed course for cooking treatment, separate and independent feeders for introducing separate sets of cans into the drum at different points for movement through said course and for maintaining said separate sets of cans segregated through such course, and separate and independent injectors for discharging the sets of cans from the drum at different points and in separate relationship at the completion of the cooking operation.

17. In an apparatus of the character described, the combination of a cooking drum having separate and independent inlet openings in its front wall on opposite sides of its vertical center and having separate and independent discharge openings in its rear wall similarly arranged for coaction with the corresponding inlet openings in the front wall, a rotary carrier in said drum, sets of retainers upon the carrier arranged in alternation for cooperation with the respective sets of inlets and outlets, separate and independent feeders for introducing cans through the said separate and independent inlets into the retainers, means for shifting the cans along said retainers toward the outlets, separate and independent discharge devices for discharging the cans through said separate and independent discharge openings, and means for intermittently operating the carrier to bring the retainers into alinement with their coacting inlets and outlets and operating the feeding and discharge means in timed accord therewith.

18. In an apparatus of the character described, the combination of a cooking drum, a cooling drum, said drums being arranged one in advance of the other and in different parallel vertical planes and having can inlets and outlets, a valved passage directly connecting the can outlet of the cooking drum with the can inlet of the cooling drum, coaxially mounted rotary carriers in said drums, similarly disposed can retainers upon the carriers so arranged that corresponding retainers on the carriers are adapted to simultaneously register with the inlets and outlets in the drums, means for introducing cans through the inlets of the cooking drum into the retainers of the carrier therein, discharging the same from said drum and through said valved passage into the retainers of the carrier of the cooling drum and finally discharging the cans from the latter-named drum, means for controlling the valve in the valved passage, and means for shifting the cans across the carrier of each drum and between the outlets and inlets of the respective drums.

19. In an apparatus of the character described, the combination of a cooking drum, a cooling drum, said drums having can inlets and outlets, valves controlling the inlet of the cooking drum and the outlet of the cooling drum, a valved passage directly connecting the outlet of the cooking drum with the inlet of the cooling drum, a rotary carrier within each drum, can retainers upon the carriers, a shaft extending through the drums and supporting both carriers, means for intermittently turning the shaft for intermittently rotating the carriers in unison to bring the retainers thereof into registry with the inlets and outlets thereof, means for controlling said valves to cause the same to open and close at timed periods, and means for feeding cans through the inlets and outlets and valved passage and along the retainers of the carriers so as to cause the cans to be carried through a course of treatment and successively through the drums.

20. In an apparatus of the character described, an annular drum having a front vertical wall provided with a can inlet opening and a rear vertical wall provided with a can discharge opening, a horizontal transverse shaft journaled in said walls, a rotary carrier in said drum and mounted on said shaft, an annular series of transverse can receiving channels on the periphery of said carrier adapted to slidably grip and hold cans contained therein, a fixed spiral shifter upon the drum for engaging portions of cans projecting from the retainers and feeding them at a fixed ratio along said retainers between the inlet and discharge openings at a fixed point in the rotation of the carrier, a helical shifter upon the drum extending partially around the circumference of the carrier and composed of a plurality of independent sections movable radially toward and from the periphery of the carrier, whereby one or more additional feeders may be presented for action at one or more different points in the revolution of the carrier for additionally shifting the cans along the retainers without diverting the cans from the retainers in which they are held, and means for imparting rotary motion to the carrier.

21. In an apparatus of the character described, a drum having inlet and outlet openings in opposed walls thereof, a rotary carrier within the drum, can retainers on the carrier adapted in the movements thereof to register with said openings, said retainers being of a form to engage and positively hold the cans therein, while permitting movement of said cans along said retainers, and means for shifting the cans along the retainers between the inlet and outlet openings in the rotation of the carrier.

22. In an apparatus of the character described, a drum having inlet and outlet openings in opposed walls thereof, a rotary carrier within the drum, fixedly mounted can retainers upon the periphery of the carrier adapted in the rotation thereof to register with said inlet and outlet openings, said retainers being of partially circular form to substantially embrace the greater portion of the body of a can and yieldingly engage and hold the same therein, said yielding engagement being such as to compensate for variations in sizes and shapes in cans while retaining the same and permitting sliding movement of the cans along the retainers, and means for slidably shifting said cans in said retainers in the rotation of the carrier.

23. In an apparatus of the character described, a drum having inlet and outlet openings in opposed walls thereof, means for supplying fluid pressure to said drum, a rotary carrier within the drum provided with can retainers adapted to register with said inlet and outlet openings, a valve for substantially sealing each inlet and outlet opening against escape of fluid pressure, said valve having can receiving compartments and movable to successively shift said compartments to receiving and discharging positions, and a feed device associated with each valve and comprising members in said compartments alternately reciprocated and projected to permit reception of a can within a compartment and thereafter to eject the same.

24. In an apparatus of the character described, the combination of a treatment drum, a rotary carrier within the drum, means for introducing cans into the carrier from one side of the drum and discharging cans from the carrier through an opposed side of the drum, and means supported by the drum for shifting the cans on straight lines across the periphery of the carrier, said means being operable for action at one or more points on the drum in the path of rotation of the carrier for regulating the time period of travel of the cans without variation in their straight line of travel across the periphery of the carrier.

25. In an apparatus of the character described, the combination of a treatment drum, a rotary carrier within the drum, means for introducing cans into the carrier from one side of the drum and discharging the cans from the carrier at an opposed side of the drum, and a sectional helical track on the drum comprising portions adapted to be operated at a plurality of points in the path of rotary travel of the cans on the drum for shifting said cans on straight invariable lines across the periphery of the carrier.

26. In an apparatus of the character described, the combination of a treatment drum, a rotary carrier within the drum and having can retainers extending on straight lines across its periphery, means for introducing cans into the carrier from one side of the drum and discharging the cans from the carrier in an opposed side of the drum, and devices mounted upon the drum and adjustable radially toward and from the carrier for shifting the cans in said retainers across the carrier toward the outlet point, said devices being operative at one or a plurality of points around and across the face of the drum for shifting the cans at one or more points and at different periods in the rotation of the drum in the course of travel of cans in the retainers between the inlet and outlet points without varying the course of travel of the cans in their respective retainers.

27. In an apparatus of the character described, the combination of a cooking drum having openings for admission and discharge of cans, a rotary carrier in said drum provided with an annular series of can retainers, each in the form of a straight channel extending across the periphery thereof, feeding means coacting with said openings for delivering cans to and discharging cans from the retainers, and a helical shifter on the drum extending partially around the circumference of the carrier and comprising a plurality of independently adjustable sections movable radially toward or from the circumference of the drum and into the path of travel of the cans in the retainers for shifting the cans in the retainers on straight lines across the drum.

28. In an apparatus of the character described, the combination of a cooking drum, a rotary can carrier therein, means for supplying cans to the carrier at one side of the drum and discharging cans from the carrier at the opposite side of the drum, and means for shifting the cans on transverse lines across the drum, said means being operable to vary the time period of travel of the cans on such lines.

29. In an apparatus of the character described, the combination of a drum having openings for inlet and discharge of cans, a rotary can carrier in the drum having an annular series of can retainers adapted for registration with said openings in the rotary movements of the drum, plural compartment valves movable to bring their compartments alternately into can receiving and discharge positions respectively and adapted to seal said openings at all times, and conjointly movable feeders in the compartments of each valve.

30. In an apparatus of the character described, the combination of a cooking drum having openings for admission and discharge of cans, a rotary carrier in said drum provided with peripheral can retainers, feeding means coacting with said openings for delivering cans to and discharging cans from the retainers, a fixed shifter within the drum for shifting the cans at a fixed rate toward the outlet, and a helical shifter on the drum having independently adjustable sections movable into the path of travel of the cans on the retainers for shifting the same to position for discharge.

31. In an apparatus of the character described, a drum having inlet and outlet openings, can carrier means within the drum, a valve device for normally sealing and periodically uncovering each opening, and a reciprocatory can feeder, having an operative movement independent of the movement of the valve device, for positively shifting a can through the opening when said valve device uncovers the opening.

32. In an apparatus of the character described, a drum having inlet and discharge openings, a can carrier within the drum, and mechanism governing the feed and discharge of cans through the inlet and outlet openings, said mechanism including a fluid pressure actuated feeder for each opening and a valve device for closing the opening between periods of operation of the feeder.

33. In an apparatus of the character described, the combination of a drum having inlet and outlet openings, a can carrier within the drum, and feeding mechanism for moving cans through said openings including a rotary valve for governing each opening, and a reciprocating feeder movable through said valve.

34. In an apparatus of the character described, the combination of a drum having inlet and outlet openings, a can carrier within the drum, a rotary valve for sealing each opening and periodically uncovering the same, and a fluid pressure actuated can feeder carried by and movable with said valve.

35. In an apparatus of the character described, the combination of a drum having inlet and outlet openings, a can carrier within the drum, a rotary valve governing each opening and having a diametrically extending passage provided with a partition forming inlet and discharge chambers, a feeder composed of conjointly movable pistons operating in said chambers, and means for shifting the rotary valve to bring the piston chambers of each valve alternately into receiving and discharging positions and to dispose said valve to seal the opening between intervals of operation thereof.

36. In an apparatus of the character described, the combination of a drum having inlet and outlet openings, a rotary can carrier within the drum, means for shifting the cans across the drum between the inlet and outlet openings, feeders associated with the openings, each comprising a rotary valve for normally sealing the opening, said valve having opposed compartments adapted to alternately register with the opening on each half revolution of the valve, fluid pressure pistons operating in said chambers, and means for operating the valves and pistons.

37. In an apparatus of the character described, the combination of a drum having inlet and outlet openings at opposite sides thereof, a rotary can carrier within the drum, means for shifting cans across said carrier, valve casings in communication with the openings, valves in the casings for normally sealing said openings, conjointly operating reciprocatory injectors and ejectors cooperating with said valves for feeding cans therethrough, feed devices for feeding cans to the inlet valves from a source of supply and to the outlet valves from the can carrier, and means for operating said parts.

38. In an apparatus of the character described, the combination of a drum having inlet and outlet openings in opposite walls thereof, a movable can carrier within the drum, means for shifting cans across said carrier, injector and ejector feed valve casings communicating with the inlet and outlet openings, valves in said casings movable to cover and uncover the openings, fluid pressure actuated injectors and ejectors in the injector and ejector valve casings for moving cans therethrough when the valves are in open position, and means for periodically operating the moving parts in timed accord.

39. In an apparatus of the character described, the combination of a drum having inlet and outlet openings in opposed walls thereof, inlet and ejector valve casings communicating with said openings, inlet and ejector valves in said casings movable to cover and uncover said openings, fluid pressure actuated reciprocatory can injectors and ejectors associated with the valves for moving cans therethrough when the valves are in open position, combined oscillatory and reciprocatory feeders for feeding the cans to the respective valves, and means for periodically operating the working parts in timed accord.

40. In an apparatus of the character described, the combination of a drum having inlet and outlet openings in opposed walls thereof, a rotary can carrier within the drum, means for shifting cans across said carrier, injector and ejector valve casings communicating with the inlet and outlet openings and having inlet and outlet passages, a rotary valve in each of said casings having chambers operative on each half revolution of the valve to alternately register with said inlet and outlet openings in the valve casings, fluid pressure pistons operating in said chambers, feeders for feeding cans through the inlet openings of the valve casings to the valve chambers disposed in receiving position, and means for periodically operating the parts of the apparatus in timed accord.

41. In an apparatus of the character described, the combination of a drum having inlet and outlet openings, a rotary can carrier within the drum having retainers adapted to register with said openings, means for shifting cans held in said retainers across the drum, means for intermittently rotating the drum, reciprocatory feeders for feeding cans to the drum and discharging the same therefrom through the inlet and outlet openings in the drum, and means for periodically operating said feeders.

42. In an apparatus of the character described, the combination of a drum having inlet and outlet openings in opposed walls vertical thereof, a rotary can carrier within the drum mounted on a horizontal transverse axis and having can retainers disposed transversely on the periphery thereof and adapted to register with said inlet and outlet openings, means for slidably shifting the cans endwise in the retainers across the drum, means for periodically turning the can carrier, feeders for slidably feeding cans endwise to the drum and similarly discharging the same therefrom through said inlet and outlet openings, means for periodically operating said feeders, and means for sealing the openings at all times in the operation of the apparatus.

43. In an apparatus of the character described, the combination of a drum having sets of inlet and outlet openings in its front and rear walls disposed on opposite sides of its vertical center, a rotary carrier within the drum, transversely extending retainers on the periphery of said carrier, a feed wheel for intermittently turning the carrier having teeth equal in number to one-half the can retainers on the carrier, to adapt said carrier to be turned a distance equal to the distance between two retainers on each working motion thereof, means for intermittently turning said feed wheel the distance of a tooth at a time, means for shifting the cans in the retainers across the periphery of the carrier, feeders for feeding cans to and discharging cans from said retainers through the inlet and outlet openings in the drum, and means for operating said feeders at properly timed intervals.

44. In an apparatus of the character described, the combination of a drum having inlet and outlet openings in opposed walls thereof, a rotary carrier within the drum, transversely extending can retainers upon the periphery of the carrier, means in the drum for shifting the cans along said retainers across the periphery of the drum, means for intermittently rotating the carrier, valve casings communicating with the inlet and outlet openings, periodically operated valves in said casings for covering and uncovering the openings, injectors and ejectors within the valve casings and movable with the valves thereof for introducing and discharging cans through the inlet and outlet openings of the drums, longitudinally reciprocating and oscillatory shafts, feeders actuated by said shafts for movement into and out of working position and for shifting cans into the receiving compartments of the valves, and means for periodically oscillating and reciprocating said shafts.

45. In an apparatus of the character described, the combination of cooking and cooling drums, arranged in different vertical planes one in advance of the other, each drum having a can inlet in its front wall and a can outlet in its rear wall, movable valves controlling said inlets, the inlet valve of the cooking drum and outlet valve of the cooling drum each having a reciprocatory feeder for advancing cans therethrough, a direct connection between the outlet of the cooking drum and inlet of the cooling drum, a valve in said connection controlling said inlet and outlet and having a reciprocatory feeder for advancing cans through said valve, a horizontally disposed shaft extending through said drums, rotary carriers in said drums mounted on said shaft, transverse rows of similarly arranged can retainers upon the peripheries of said carriers, means arranged within the drums for shifting the cans in the retainers across the carriers, means for feeding cans from a source of supply to the valved inlet of the cooking drum and from the retainers to the outlets of the respective drums so as to be engaged and moved by the reciprocatory feeders of the valves, means for operating the valves and the feeders in proper timed accord, means for supplying a heating fluid to the cooking drum, and means for supplying a cooling fluid to the cooling drum.

46. In an apparatus of the character described, a drum, means for supplying cans to and discharging the same from the drum, a rotary can carrier within the drum having transverse individual peripheral can retainers, a helical shifter supported within the drum separate from and independent of said containers composed of independent radially movable sections, and means for radially moving one or more sections of the shifter in and out for engagement with cans in the retainers to shift the cans transversely of the drum without varying the normal line of travel of the cans in the retainers.

47. In an apparatus of the character described, a drum having opposed walls, one provided with a plurality of can inlet openings and the other provided with a plurality of can discharge openings, a rotary carrier within the drum provided with sets of alternating transversely arranged peripheral can retainers adapted to register with the respective sets of inlet and outlet openings in the rotation of the drum, rotary valves for sealing said openings at all times, said valves having each a pair of diametrically disposed can receiving compartments, reciprocatory feeders in said compartments, means for intermittently operating the carrier, means for intermittently operating the valves to alternately bring the compartments thereof into receiving and discharging position, and means for operating said feeders.

48. In an apparatus of the character described, the combination of a cooking drum having vertically disposed front and rear walls, a cooling drum arranged in rear of the cooking drum and having similar walls, the rear wall of the cooking drum being arranged in approximate relation to the front wall of the cooling drum, the front and rear walls of the drums being respectively provided with similarly located inlet and outlet openings, synchronously movable can carriers within the drums provided with retainers adapted to be brought by the movements thereof into register with said openings, rotary valves controlling the openings in the front wall of the cooking drum and rear wall of the cooling drum, rotary valved can feed passages between the discharge openings in the rear wall of the cooking drum and the inlet openings in the front wall of the cooling drum, injectors and ejectors associated with said openings, and means for simultaneously operating the valves and simultaneously operating the injectors and ejectors in timed accord.

49. In an apparatus of the character described, the combination of a drum, a rotary carrier therein provided with an annular series of channeled retainers extending across the periphery of said carrier, said retainers having inlet ends at one side of the carrier and outlet ends at the opposite side of the carrier, means for feeding cans into the retainers at their inlet ends and discharging the cans from the retainers at their outlet ends, and means upon the drum and comprising independently movable members disposed and operative at a plurality of points in the path of travel of the carrier for engaging and shifting the cans.

50. In a device of the character described, a drum having inlet and outlet openings arranged respectively at diametrically opposite sides thereof, an intermittently movable rotary carrier in said drum, can retainers extending across the periphery of the drum and adapted to register with said inlet and outlet, means upon the drum for normally advancing the cans at a fixed feed ratio along each retainer, said means operating at a substantially fixed point in the path of rotation of the drum, and means for increasing the feed ratio of the cans in the retainers, said means operating to increase the rate of speed of the cans in a retainer without diverting the cans therefrom.

51. In an apparatus of the character described, the combination of a drum having a can inlet opening and a can outlet opening in opposite walls thereof, a rotary carrier in said drum, a series of independent individual can retainers on the carrier forming guide channels extending across the periphery of the carrier from side to side thereof, means upon the drum normally operative at a fixed point in the path of revolution of the drum for advancing the cans at a fixed rate of speed along the retainers, and means upon the drum and adjustable inwardly toward the periphery of the carrier for engaging and accelerating the advance of a row of cans in the retainers without diverting the rows of cans from their individual retainers.

52. In an apparatus of the character described, a drum having at least two can inlet openings, and two can discharge openings, one for cooperation with each inlet opening, a rotary carrier in the drum, sets of can holders on the carrier alternately arranged to register with the respective sets of can inlet and outlet openings, means for shifting the cans along said holders, a valve controlling each opening, and feeders for moving cans through the valves.

In testimony whereof I affix my signature.

ALEXANDER K. RARIG.